United States Patent
Mlynarczyk et al.

(10) Patent No.: US 7,131,109 B2
(45) Date of Patent: Oct. 31, 2006

(54) METHOD OF MANAGING INFORMATION IN JAVA

(75) Inventors: Jérôme Mlynarczyk, Paris (FR); Sylvain Chafer, Paris (FR); Linda Hélène Hauw, Paris (FR); Omar Marzouki, Paris (FR)

(73) Assignee: Alcatel, Paris (FR)

( * ) Notice: Subject to any disclaimer, the term of this patent is extended or adjusted under 35 U.S.C. 154(b) by 706 days.

(21) Appl. No.: 09/888,449

(22) Filed: Jun. 26, 2001

(65) Prior Publication Data

US 2002/0029375 A1    Mar. 7, 2002

(30) Foreign Application Priority Data

Jun. 27, 2000    (FR) .................................. 00 08 243

(51) Int. Cl.
*G06F 9/44* (2006.01)
*G06F 9/445* (2006.01)

(52) U.S. Cl. ...................... 717/108; 717/162; 717/167; 717/176

(58) Field of Classification Search ........ 717/162–176, 717/101–108; 709/203; 719/332, 315, 316; 707/102, 104.1; 718/105; 711/122
See application file for complete search history.

(56) References Cited

U.S. PATENT DOCUMENTS

| | | | |
|---|---|---|---|
| 5,737,607 A * | 4/1998 | Hamilton et al. ........... 719/316 |
| 5,761,670 A * | 6/1998 | Joy ......................... 707/103 R |
| 5,809,235 A * | 9/1998 | Sharma et al. .............. 709/230 |
| 5,938,733 A * | 8/1999 | Heimsoth et al. ........... 709/230 |
| 5,983,020 A * | 11/1999 | Sweeney et al. ............ 717/141 |
| 6,085,030 A * | 7/2000 | Whitehead et al. ......... 709/203 |
| 6,230,314 B1 * | 5/2001 | Sweeney et al. ............ 717/108 |
| 6,233,621 B1 * | 5/2001 | Joy ............................ 719/315 |
| 6,381,742 B1 * | 4/2002 | Forbes et al. ............... 717/176 |
| 6,389,592 B1 * | 5/2002 | Ayres et al. ................ 717/172 |
| 6,442,565 B1 * | 8/2002 | Tyra et al. .................. 707/102 |

(Continued)

FOREIGN PATENT DOCUMENTS

GB      2 326 255 A      12/1998

(Continued)

OTHER PUBLICATIONS

Dan Becker, Design networked applications in RMI using the Adapter design pattern; A guide to correctly adapting local Java objects for the Web, May 1, 1999, Javaworld, p. 1.*

(Continued)

*Primary Examiner*—Wei Y. Zhen
*Assistant Examiner*—Satish S. Rampuria
(74) *Attorney, Agent, or Firm*—Sughrue Mion, PLLC

(57) ABSTRACT

A method of managing information in a distributed system context including a local system and a remote system and using a remote invocation method of the JAVA language, said language including instructions and enabling creation of objects from classes having hierarchical relations between them, which method includes defining in the local system classes replicating a hierarchy of classes of the remote system and including means of access to said classes of the remote system in order to enable use in the local system of instructions specific to classes defined in the remote system.

3 Claims, 2 Drawing Sheets

U.S. PATENT DOCUMENTS

| | | | |
|---|---|---|---|
| 6,446,077 B1 * | 9/2002 | Straube et al. | 707/103 Y |
| 6,536,037 B1 * | 3/2003 | Guheen et al. | 717/151 |
| 6,542,964 B1 * | 4/2003 | Scharber | 711/122 |
| 6,549,955 B1 * | 4/2003 | Guthrie et al. | 719/315 |
| 6,622,175 B1 * | 9/2003 | Piller | 719/313 |
| 6,629,128 B1 * | 9/2003 | Glass | 709/203 |
| 6,658,492 B1 * | 12/2003 | Kawahara et al. | 719/332 |
| 6,678,715 B1 * | 1/2004 | Ando | 718/105 |
| 6,820,136 B1 * | 11/2004 | Pham et al. | 709/248 |
| 2002/0002557 A1 * | 1/2002 | Straube et al. | 707/103 Z |
| 2002/0082945 A1 * | 6/2002 | Tenorio | 705/27 |
| 2002/0144248 A1 * | 10/2002 | Forbes et al. | 717/167 |
| 2002/0194287 A1 * | 12/2002 | Tyra et al. | 709/206 |
| 2003/0177170 A1 * | 9/2003 | Glass | 709/203 |
| 2004/0019612 A1 * | 1/2004 | Tyra et al. | 707/104.1 |

FOREIGN PATENT DOCUMENTS

| | | |
|---|---|---|
| JP | 09-034708 * | 7/1997 |
| WO | WO 99/77617 A2 | 12/2001 |

OTHER PUBLICATIONS

Andy Krumel, Revolutionary RMI: Dynamic class loading and behavior objects; Find out how RMI can help you define extensible, distributed object- oriented framworks, Dec. 1, 1998, Javaworld, p. 1.*

Niall McKay, JavaSoft to fix RMI compatibility, Jun. 30, 1997, InforWorld, vol. 19, Iss. 26; p. 14 (1 page).*

Horsttmann et al., Core Java TM. 2: vol. II—Advanced Features, Prentice Hall PTR, Dec. 2001, pp.:1-44 of printed.*

Preiss, Data Structures and Algorithms with Object-Oriented Design Patterns in Java, 1998, pp: 1-3 or printed.*

Triantafillou et al., Multiclass replicated data management: exploiting replication to improve efficiency, IEEE, vol. 5, Issue 2, Feb. 1994 pp.:121-138.*

Kistler, Increasing file system availability through second-class replication, IEEE, Nov. 1990 pp.:65-69.*

Selia et al., Analyzing Web-based simulation data, IEEE, vol. 19, Issue 1, Feb.-Mar. 2000 pp.:16-19.*

* cited by examiner

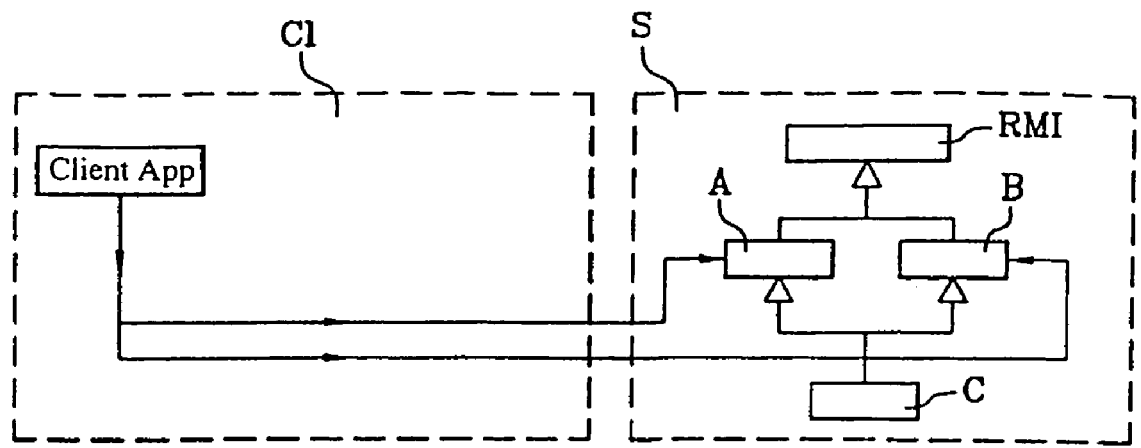
Fig. 3 - Prior art
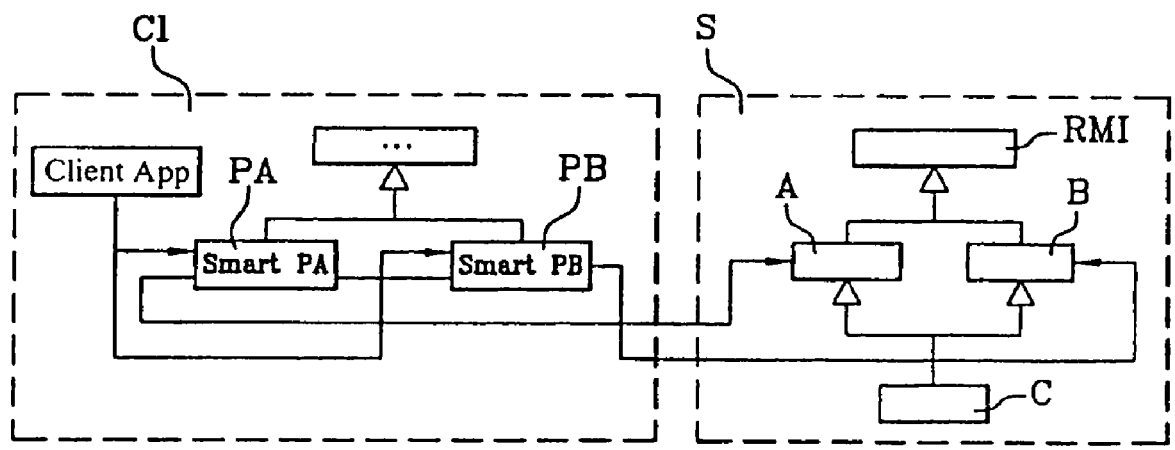
Fig. 4

METHOD OF MANAGING INFORMATION IN JAVA

The invention relates to a method of managing information in a distributed system context and using a remote invocation method of the JAVA language. The field of the invention is that of programming in a distributed system, and more specifically that of object-oriented programming in JAVA using the remote method invocation (RMI) mechanism.

BACKGROUND OF THE INVENTION

Object-oriented programming defines classes each having its own specific characteristics. Classes are interlinked by mother-daughter relations, a daughter class inheriting characteristics from its mother class. Characteristics include "variables" and "methods". A class is like a mold from which as many objects as necessary can be created.

Consider, for example, the vehicle class V for which variables (color, number of wheels, etc.) and methods (go forward, stop, etc.) are declared. Before an object from this class can be used, the programmer must instantiate it, i.e. create it by means of an instruction "new":

v=new V (green, 4, etc.)

By means of the above instruction the programmer creates an object v, which is also referred to as an instance, and which is a green vehicle with four wheels, etc. The methods of the class of the object can then be invoked, i.e. called in order to execute them.

If the programmer is working on a non-distributed system, he can instantiate an object directly, as described previously, and invoke the methods of that object.

One concept of the JAVA object-oriented programming language is referred to as an "interface". The inheritance rules for interfaces are different from those for classes. An interface does not define any non-constant variable and cannot be instantiated in the manner previously described. Initially the interface and its methods are declared, but the methods are defined in a daughter class of the interface. FIG. 1 shows the hierarchy of this inheritance in the case of two sister interfaces A and B from which a class C (ABImpl) inherits for implementing the interfaces A and B. The arrows linking the classes and interfaces represent the inheritance relation.

The interfaces A and B themselves inherit from other interfaces D and E that will not be described in detail.

Thus, if the "display" method is declared for interface A and defined in class C (ABImpl), for example, it can be invoked for the object a as follows:

A a=new ABImpl ( );
a.display ( );

To invoke the "print" method of interface B, the programmer can go via interface A using an instruction "horizontal casting" which entails considering a as an instance of class B, which is a sister of class A:

B b=(B) a;
b.print ( );

The semantic definition of the instruction "horizontal casting" is as follows (see FIG. 2):

given three classes X, Y, Z and an instance z of class Z,
Z inherits directly or indirectly from X and from Y,
X does not inherit directly or indirectly from Y,
Y does not inherit directly or indirectly from X.
Horizontal casting is the operation of "casting" X on z in Y.

If the system is distributed, the classes and the interfaces are defined in a central server (remote system) and the instances are stored in a naming system by a naming service establishing a correspondence between a logical name and a remote object reference. In this example, after it has been instantiated in the server, the object v is stored in the naming system by means of the instruction:

registry (v, "greenvehicle");

The naming system is usually in a machine independent of the server. A distributed system includes one or more servers, a machine for the naming system and one or more local systems on a client site, which is generally remote from the site of the server. The server(s) and the local system(s) include one or more interfaces through which they communicate.

A programmer working on a client site cannot instantiate at this level an object of a class defined in the server, i.e. cannot use the instruction "new". The programmer must recover the object instantiated in the server and stored in the naming system and recovers it from the naming system by means of its reference. In this example, the programmer recovers the object v by means of its reference "greenvehicle" using the instruction:

V v=NamingService.get ("greenvehicle");

The programmer can then invoke methods characteristic of the class of the object. These steps constitute the principal steps of using the remote method invocation (RMI) system, by means of which a client can recover the reference to a remote object from a local system in order to use the remote object. The RMI system includes a RMI interface and an implementation class of the RMI interface.

FIG. 3 is a diagram showing a distributed system including a server S and a local system C1. The RMI interfaces A and B and the class C (ABImpl) for instantiating the objects of the interfaces A and B, as previously described, are defined in the server S. The interfaces A and B themselves inherit from the RMI interface, and objects instantiated by the server S can therefore be recovered by the system C1. The client application "Client App" consists of a set of instructions; the arrows with black arrowheads between "Client App" and the interfaces A and B indicate that the objects A and B used in "Client App" are recovered from the server S in which they are defined. The arrows with white arrowheads indicate inheritance relations and the arrows with black arrowheads indicate use relations.

However, in the case of interfaces of a distributed system, the instruction "horizontal casting" which then applies to a remote object, i.e. to an object whose methods are invoked via the RMI interface, cannot be used.

If the client site has more than one interface for using remote objects, the remote object reference recovered via one of them cannot be considered as a valid object reference for the other interfaces: to be able to use the same object from another interface, it is necessary to repeat the RMI steps previously described, which overloads the server and the naming service because it requires an additional record for each interface supported.

OBJECT AND SUMMARY OF THE INVENTION

The object of the invention is to facilitate the work of the programmer by rendering the distribution of the system transparent. The programmer can then recover a reference to a remote object in the same way as he would for a local object, especially in the case of interfaces.

The invention provides a method of managing information in a distributed system including at lease one local system and one remote system and using a remote invocation method of the JAVA language, said language including instructions and enabling creation of objects from classes of belonging having hierarchical relations between them, said method consisting of defining in the local system classes replicating the hierarchy of classes in the remote system and including means of access to said classes in the remote system in order to enable use in the local system of instructions specific to classes defined in the remote system.

According to one feature of the invention one of the instructions is the instruction "horizontal casting".

The invention also provides a distributed information management system including at lease one local system C1 and at least one remote system S including a plurality of interfaces A, B and using a remote method invocation mechanism of the JAVA language, said language including instructions and enabling creation of objects from classes of belonging, wherein the local system C1 includes a "proxy" PA, PB for each interface A, B and said proxy PA or PB is defined to enable use in the local system C1 of instructions specific to the interfaces A, B defined in the remote system S.

BRIEF DESCRIPTION OF THE DRAWINGS

Other features and advantages of the invention will become clearly apparent on reading the following description, which is given by way of non-limiting example and with reference to the accompanying drawings, in which:

FIG. 3 is a diagram showing the relations within a prior art distributed system including a server S and a local system C1, and FIG. 4 shows the same system in accordance with the invention.

MORE DETAILED DESCRIPTION

Figure 1:
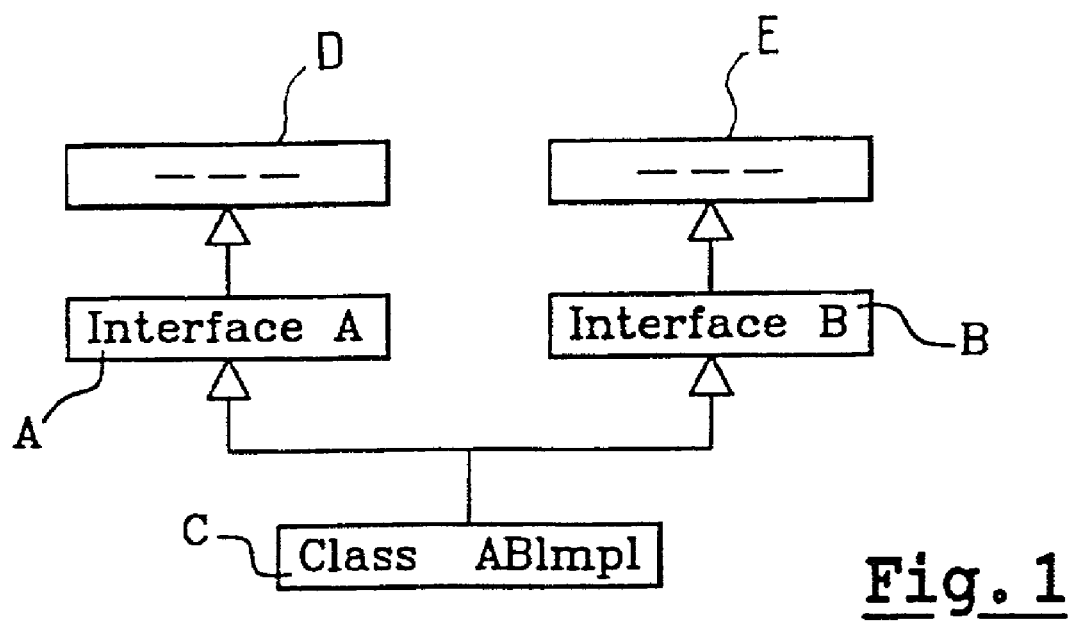
FIG. 1 shows an inheritance hierarchy between two interfaces and one class of a non-distributed system.
Figure 2:
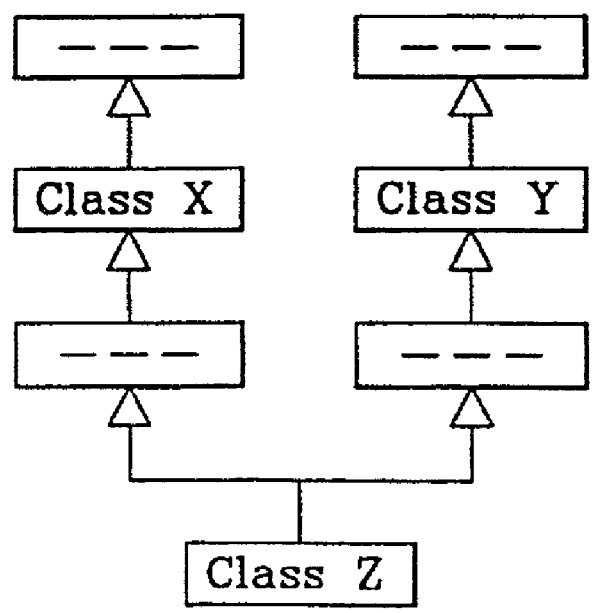
FIG. 2 illustrates the semantic definition of the instruction "horizontal casting"

As shown in FIG. 4, the invention places between the client application "Client App" and the server S classes replicating in the system Cl the same inheritance hierarchy that applies between them in the server S. The gateway PA or "SmartProxyA" class corresponds to the interface A of the server S and the gateway PB or "SmartProxyB" class corresponds to the interface B. The classes PA and PB themselves inherit from other classes. The classes PA and PB replicated in the system Cl are local and independent of the corresponding remote interfaces. This makes it possible to exploit the flexibility of programming based on local classes.

The "SmartProxy A" and "SmartProxy B" classes PA and PB effect by delegation the processing of the interfaces A and B, respectively. They encapsulate the references to the remote objects in the naming system.

In the context of a distributed system, the programmer therefore designs applications in a software context including an application programming interface (API) and a string of tools. In other words the applications are developed in accordance with specific rules as a function of the steps.

At the time of an instantiation, the objects are initialized with default values; a builder mechanism enables the programmer to define other initialization values.

A builder for recovering the references of the remote objects via the naming system is therefore defined in the "SmartProxy A" and "SmartProxy B" classes PA and PB. The instruction "new" can then be used to instantiate objects of the classes PA and PB defined locally in the system Cl but representing the interfaces A and B by delegation.

The instructions for locally invoking the "display" method of the interface A defined in the server in "Client App", namely:
A a=NamingService.get ("referenceA");
a.display ( ); become, in accordance with the invention:
PA sPA=new SmartProxyA;
SPA.display ( );

The programmer can then use horizontal casting between the classes PA and PB defined locally to invoke a method of the interface B defined in the server, for example the "print" method:
PB sPB=(PB) sPA;
SPB.print ( );

The invention claimed is:

1. A method of managing information in a distributed system including at least one local system and at least one remote system and using a remote invocation method of the JAVA language, said language including instructions and enabling creation of objects from classes of belonging having hierarchical relations between them, which method includes defining in the local system classes replicating the hierarchy of classes in the remote system and including means of access to said classes in the remote system in order to enable use in the local system of instructions specific to classes defined in the remote system.

2. A method according to claim 1, wherein one of the instructions is a "horizontal casting" instruction.

3. A distributed information management system including at least one local system and at least one remote system including a plurality of interfaces and using a remote method invocation mechanism of the JAVA language, said language including instructions and enabling creation of objects from classes of belonging, wherein the local system includes a "proxy" for each interface and said proxy is defined to enable use in the local system of instructions specific to the interfaces defined in the remote system.

* * * * *